(12) United States Patent
Yue

(10) Patent No.: US 7,062,285 B2
(45) Date of Patent: Jun. 13, 2006

(54) RELIABLE DECODING OF QUICK PAGING CHANNEL IN IS2000 HANDSETS

(75) Inventor: Lin Yue, San Jose, CA (US)

(73) Assignee: Koninklijke Philips Electronics N.V.

( * ) Notice: Subject to any disclaimer, the term of this patent is extended or adjusted under 35 U.S.C. 154(b) by 738 days.

(21) Appl. No.: 10/024,668

(22) Filed: Dec. 14, 2001

(65) Prior Publication Data

US 2003/0114132 A1 Jun. 19, 2003

(51) Int. Cl.
*H04B 7/00* (2006.01)
*H04Q 7/20* (2006.01)

(52) U.S. Cl. ...................................................... 455/515

(58) Field of Classification Search ........ 455/458–459, 455/434, 515, 237.1; 370/491, 500
See application file for complete search history.

(56) References Cited

U.S. PATENT DOCUMENTS

| | | | |
|---|---|---|---|
| 6,138,034 A | | 10/2000 | Willey |
| 6,421,540 B1 * | | 7/2002 | Gilhousen et al. .......... 455/458 |
| 6,748,010 B1 * | | 6/2004 | Butler et al. ................ 375/148 |
| 6,895,058 B1 * | | 5/2005 | Abrishamkar et al. ...... 375/259 |

FOREIGN PATENT DOCUMENTS

WO WO0057662 A 9/2000

OTHER PUBLICATIONS

WIPO Publication WO 99/43180, International Application No. PCT/US99/03529, QualComm Incorporated, San Diego California, 92121.

* cited by examiner

*Primary Examiner*—Curtis Kuntz
*Assistant Examiner*—Alexander Jamal

(57) ABSTRACT

Reliable decoding of quick paging channel is provided using first and second page indicators carried in a quick paging channel of a wireless communication system. First and second threshold values are established to determine whether the first and the second page indicators each, as received from a base station to a mobile station, is highly reliable, reasonably reliable, or unreliable. Preferably, the pilot strengths for the first and the second page indicators each is compared with the first and the second page indicators. Depending on the level of reliability of the first and the second page indicators, different actions are taken to determine whether the mobile station enters a sleep mode or decodes a next paging channel slot.

18 Claims, 3 Drawing Sheets

RELIABLE DECODING OF QUICK PAGING CHANNEL IN IS2000 HANDSETS

BACKGROUND OF THE INVENTION

1. Field of the Invention

The invention relates generally to wireless communication systems and, more particularly, to reliable decoding of page indicators in a quick paging channel.

2. Description of the Related Art

In a typical wireless communication system such as a cellular radio frequency (RF) radiotelephone system, a base station communicates with a mobile station, operating within an area served by the base station system.

Multiple access wireless communication between the base station and the mobile station occurs via RF channels that provide paths over which communication signals such as voice, data, and video are transmitted. Base-to-mobile station communications are said to occur on a forward- or down-link channel, while mobile-to-base station communications are referred to as being on a reverse- or up-link channel.

Code division multiple access (CDMA) is one example of a well-known digital RF channel technique. In general, all users of a CDMA system transmit and receive communications signals over a common frequency spectrum, and specialized codes, such as Walsh codes, are used for separating multiple communication signals from one another in the system. Each specialized code typically represents one communication channel within the common frequency spectrum. A communication channel may be, among other things, a paging channel or a traffic channel.

The IS-2000 standard provides for paging channels divided into time slots, or paging channel time slots. According to the IS-2000 standard, one paging channel may be used by the base station. Within those paging channels, a plurality of paging channel time slots are assigned to the mobile station. A base station transmits pages and other messages to a mobile station in the paging channel time slots assigned to that mobile station.

The IS-2000 standard further provides for quick paging channels. Under IS-2000, each base station has one quick paging channel. Quick paging channels, like paging channels, are divided into time slots, or quick paging channel time slots. When a mobile station is to receive a message on a paging channel, the base station enables one or more page indicators on the quick paging channel to alert the mobile station that it should monitor its assigned paging channel. This alleviates the requirement that a mobile station monitor every assigned time slot of the paging channel for messages. Instead, the mobile station may enter a sleep mode, waking only to monitor its assigned page indicators on the quick paging channel. For a mobile station to operate in an idle mode, the base station transmits to the mobile station at specific time slots only on the paging channel in the IS-95 standard. In the IS-2000 standard, however, the quick paging channel is also divided into 80 ms time slots, and specific slots are assigned to a given mobile station. In between two of such slots, a mobile station can go to sleep. This mode of operation is called a slotted mode.

For a mobile station in a slotted mode, if the page indicator in its time slot of the quick paging channel is on, the mobile station will decode the message in the next time slot of the paging channel. Otherwise, the mobile station may return to the sleep mode until the time of its next scheduled page indicator. Because the page indicators are relatively short, the mobile station conserves energy by remaining in the sleep mode for longer periods of time. Consequently, the mobile station's battery life is increased.

The purpose of the quick paging channel is that a mobile station in a slotted mode while in idle state only needs to wake up and decode the page indicators instead of an entire paging channel slot message. Since the quick paging channel contains single-bit messages without coding, its takes less power to process than the paging channel message. Power saving is expected by exploiting the quick paging channel efficiently. Typically, this depends heavily on the detection accuracy of page indicators. If page indicators are detected to be on when they are actually off, there is a false alarm, and the mobile station unnecessarily wakes up. On the other hand, if page indicators are detected to be off when they are actually on, the mobile station sleeps through the message and thus misses it.

There is therefore a need for a reliable decoding scheme for avoiding both of these cases in order to achieve longer standby time without missing calls.

SUMMARY OF THE INVENTION

A method and a system for performing the method are provided, comprising a base station and at least one mobile station in communication to define a paging channel, a quick paging channel, and first and second page indicators within the quick paging channel. The system compares the pilot strength of the first page indicator with first and second threshold values. The system also compares the pilot strength of the second page indicator with the first and the second threshold values. The system determines if the first and the second page indicators are reliably transmitted from the base station to the at least one mobile station, based on the pilot strength for the first and the second page indicators relative to the first and the second threshold values.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
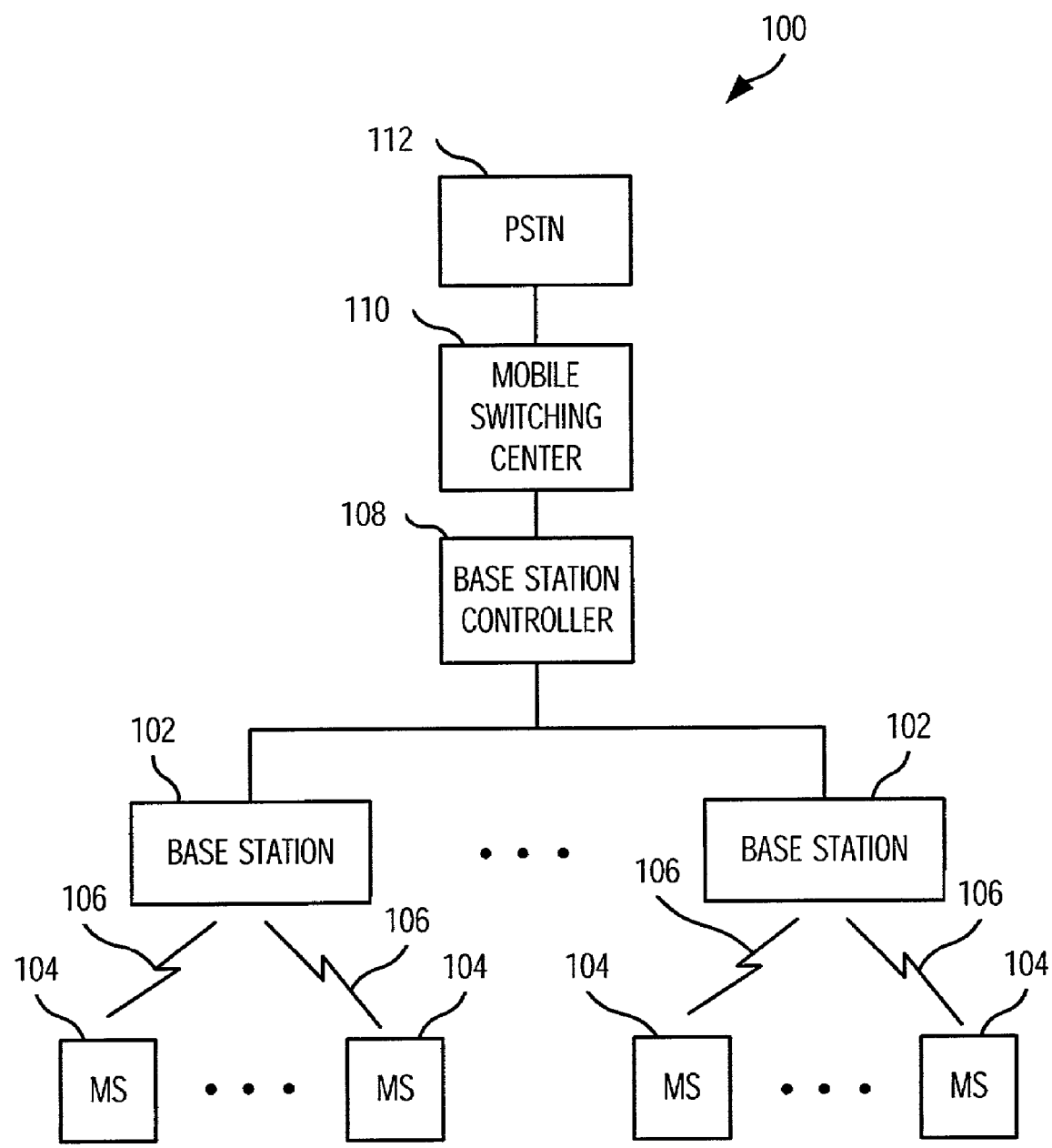
FIG. 1 is a block diagram depicting a wireless communication system suitable for use with the embodiments of the present invention.
Figure 2:
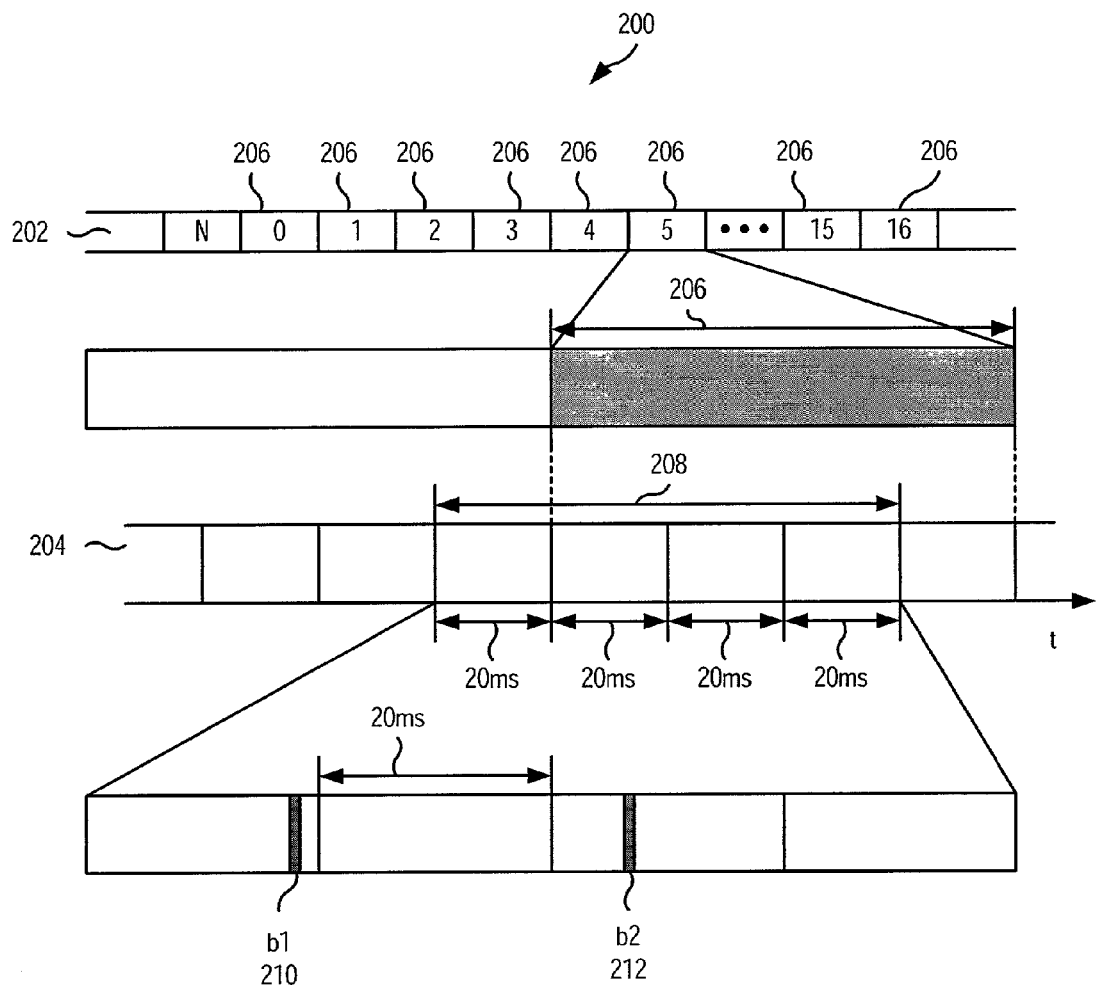
FIG. 2 is a timing diagram depicting paging channel slots and quick paging channel time slots, as contained in a paging channel and a quick paging channel, respectively.
Figure 3:
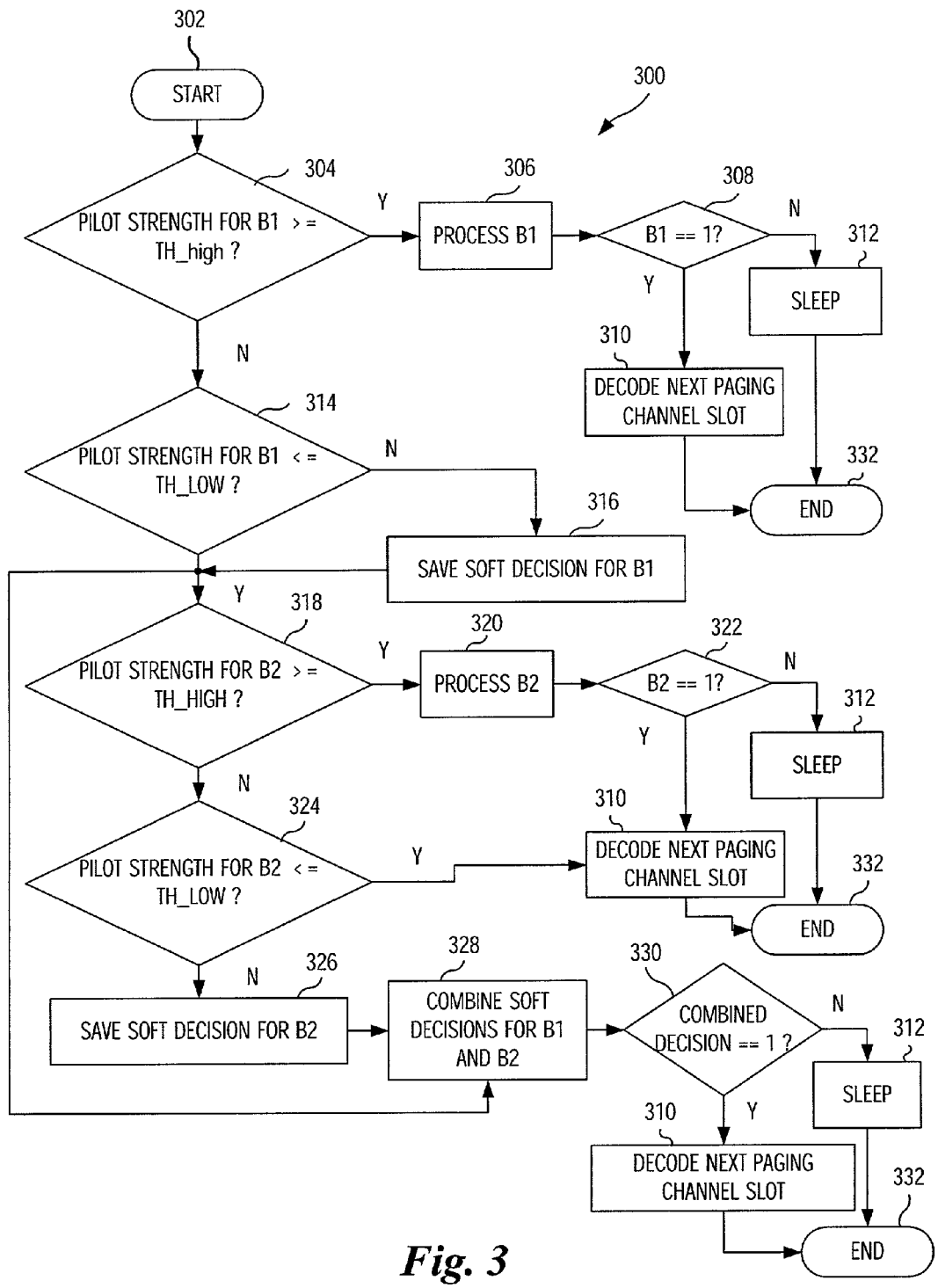
FIG. 3 is a flow diagram depicting one presently preferred method for reliably decoding page indicators in a quick paging channel.

The principles of the present invention and their advantages are best understood by referring to the illustrated operations of the embodiments depicted in FIGS. 1–3.

In FIG. 1, a reference numeral 100 designates a block diagram of a wireless communication system suitable for use with the embodiments of the present invention. As shown in FIG. 1, one or more base stations 102 communicate with one or more corresponding mobile stations 104 via wireless communication signals 106. The mobile stations 104 represent any type of transceivers designed to transmit and/or receive voice data and/or other types of data such as text messages. Examples of the mobile stations 104 include a cell phone and a mobile data terminal such as a laptop computer. The communication signals are transmitted on channels, with different channels being used for different types of communications. One type of channel is a paging channel, a forward communication channel used by the base station 102 to send pages or other messages to a mobile station 104. Another type of channel is a quick paging channel, a forward communication channel used by the base station 102 to alert the mobile station 104 that it should monitor a paging channel to receive a page or other message.

Preferably, at least one of the base stations 102 is in communication with a base station controller 108. The base station controller 108 is in communication with a mobile switching center 110. The mobile switching center 110 communicates with a public switched telephone network (PSTN) 112.

Now referring to FIG. 2, a timing diagram 200 depicts a paging channel 202 and a quick paging channel 204. The paging channel 202 is divided into paging channel time slots 206. The base station 102 of FIG. 1 transmits a message to a mobile station 104 of FIG. 1 in one or more paging channel time slots 206.

Similarly, the quick paging channel 204 is divided into quick paging channel time slots such as a quick paging channel slot 208. The quick paging channel time slot 208 comprises page indicators b1 210 and b2 212. Preferably, the page indicators b1 210 and b2 212 are each a binary digit, or bit, which enable a transmitting base station 102 of FIG. 1 to alert the corresponding mobile stations 104 of FIG. 1 that they should monitor the paging channel 202 for a message. When a mobile station 104 of FIG. 1 is not monitoring the paging channel 202, the mobile station 104 enters a sleep mode, waking periodically to monitor the page indicators b1 210 and b2 212. The base stations 102 of FIG. 1 use on-off keying modulation to transmit the page indicators b1 210 and b2 212 on the quick paging channel 204. As shown in FIG. 2, the page indicators b1 210 and b2 212 are at least 20 ms apart from each other.

FIG. 3 is a flow diagram 300 depicting a preferred method for reliably decoding page indicators in a quick paging channel. At step 302, the method is initiated. The next step 304 is to determine if the pilot strength for the page indicator b1 210 of FIG. 2 is equal to or larger than a first threshold value Th_high. Preferably, the pilot strength for the page indicator b1 210 represents the received energy of a first pilot signal (not shown) corresponding to the page indicator b1 210. The pilot signal resides in a pilot channel (not shown), and the received energy of the first pilot signal is used to indicate the quality of a portion of the channel corresponding to the page indicator b1 210. If the pilot strength for the page indicator b1 210 is equal to or larger than a first threshold value Th_high, then the page indicator b1 210 is processed in step 306. In step 308, it is determined if the page indicator b1 210 is equal to a logical one. If so, a mobile station 104 of FIG. 1 decodes the next paging channel slot 206 of FIG. 2 in step 310. If not, the mobile stations 104 enters a sleep mode in step 312.

If the pilot strength for the page indicator b1 210 is smaller than Th_high, the next step 314 is to determine if the pilot strength for the page indicator b1 210 is equal to or smaller than a second threshold value Th_low. If the pilot strength for the page indicator b1 210 is larger than a second threshold value Th_low, a "soft decision" for the page indicator b1 210 is saved as shown in step 316. Such a soft decision preferably may be an output of a matched filter (not shown) and is represented as a numerical value. The soft decision is also referred to as a matched filter soft statistic.

At this point, no hard decision is made whether a base station 102 enters a sleep mode or decodes next paging channel slot. Preferably, the first and second threshold values Th_high and Th_low are optimized using a computer simulation. The first and second threshold values Th_high and Th_low are established to determine whether the first and the second page indicators each, as received from a base station 102 to a mobile station 104, is highly reliable, reasonably reliable, or unreliable.

If the pilot strength for the page indicator b1 210 is smaller than the value Th_high, the next step 318 is to determine if the pilot strength for the page indicator b2 212 of FIG. 2 is equal to or larger than the value Th_high. As mentioned above regarding the pilot strength of the page indicator b1 210, the pilot strength for the page indicator b2 212 represents the received energy of a second pilot signal (not shown) corresponding to the page indicator b2 212. The pilot signal resides in the pilot channel, and the received energy of the pilot signal is used to indicate the quality of the quality of a portion of the channel corresponding to the page indicator b2 212. If the pilot strength for the page indicator b2 212 of FIG. 2 is equal to or larger than the value Th_high, the page indicator b2 212 is processed in step 320. In step 322, it is determined if the page indicator b2 212 is equal to a logical one. If so, a mobile station 104 of FIG. 1 decodes the next paging channel slot 206 of FIG. 2 in step 310. If not, the mobile stations 104 enters a sleep mode in step 312.

If the pilot strength for the page indicator b1 210 is smaller than the value Th_high, and if the pilot strength for the page indicator b2 212 of FIG. 2 is smaller than the value Th_high, the next step 324 is to determine if the pilot strength for the page indicator b2 212 is equal to or smaller than the value Th_low. If so, the mobile station 104 of FIG. 1 decodes the next paging channel slot 206 of FIG. 2 in step 310. If not, a "soft decision" for the page indicator b2 212 is saved as shown in step 326. Such a soft decision saved as in step 326 may include matched filter soft statistic and the pilot strength for the page indicator b2 212. At this point, no hard decision is made whether a base station 102 enters a sleep mode or decodes next paging channel slot.

In step 328, the soft decisions for the page indicators b1 210 and b2 212 are combined to generate a combined decision. In step 330, it is determined if the combined decision is a logical one. If so, a mobile station 104 of FIG. 1 decodes the next paging channel slot 206 of FIG. 2 in step 310. If not, the mobile stations 104 enters a sleep mode in step 312. The method shown in FIG. 3 ends in step 332.

Preferably, steps 302 through 332 are performed by one of the mobile stations 104 of FIG. 1. Each of the mobile stations 104 of FIG. 1 comprises one or more microprocessors (not shown) to perform steps 304 through 330. Typically, each of the one or more microprocessors comprises a semiconductor or equivalent device (not shown). Preferably, the one or more microprocessors perform the steps 302 through 332 by executing a series of instructions (not shown). For example, such instructions may be provided to the one or more microprocessors in the form of a software program (not shown).

Generally, the pilot strengths for the page indicators b1 210 and b2 212 are each compared with the first and the second page indicators to determine the level of reliability of the page indicators b1 210 and b2 212. Depending on the level of reliability of the page indicators b1 210 and b2 212, different actions are taken to determine whether the mobile station enters a sleep mode or decodes a next paging channel slot.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. In a wireless communication system, wherein a paging channel, a quick paging channel, and a pilot channel are employed to transmit messages from a base station to a mobile station, the quick paging channel including first and second page indicators, a method comprising the steps of:

determining if the strength of a first pilot signal is smaller than a first threshold value, the first pilot signal residing in the pilot channel and being associated with the first page indicator;

determining if the strength of the first pilot signal is larger than a second threshold value, the first threshold value being larger than the second threshold value;

determining if the strength of a second pilot signal is smaller than the first threshold value, the second pilot signal residing in the pilot channel and being associated with the second page indicator;

determining if the strength of the second pilot signal is larger than the second threshold value;

if the strength of the first pilot signal is not smaller than the first threshold value, processing the first page indicator, and determining if the first page indicator is detected to be on;

if the strength of the first pilot signal is smaller than the first threshold value, and if the strength of the first pilot signal is larger than the second threshold value, saving a first soft decision for the first page indicator;

if the strength of the first pilot signal is smaller than the first threshold value, and if the strength of the second pilot signal is not smaller than the first threshold value, processing the second page indicator, and determining if the second page indicator is detected to be on; and if the strength of the first pilot signal is smaller than the first threshold value, and if the strength of the second pilot signal is larger than the second threshold value, saving a second soft decision for the second page indicator, combining the first and the second soft decisions to obtain a combined decision, and determining if the combined decision is on.

2. The method of claim 1, further comprising the steps of:

if the strength of the first pilot signal is not smaller than the first threshold value, and if the first page indicator is detected to be on, decoding a subsequent paging channel slot;

if the strength of the first pilot signal is not smaller than the first threshold value, and if the first page indicator is detected to be off, switching the mobile station to a sleep mode;

if the strength of the first pilot signal is smaller than the first threshold value, if the strength of the second pilot signal is not smaller than the first threshold value, and if the second page indicator is detected to be on, decoding the subsequent paging channel slot;

if the strength of the first pilot signal is smaller than the first threshold value, if the strength of the second pilot signal is not smaller than the first threshold value, and if the second page indicator is detected to be off, switching the mobile station to a sleep mode;

if the strength of the first pilot signal is smaller than the first threshold value, and if the strength of the second pilot signal is not lamer than the second threshold value, decoding the subsequent paging channel slot;

if the strength of the first pilot signal is smaller than the first threshold value, if the strength of the second pilot signal is larger than the second threshold value, and if the combined decision is on, decoding the subsequent paging channel slot; and if the strength of the first pilot signal is smaller than the first threshold value, if the strength of the second pilot signal is larger than the second threshold value, and if the combined decision is off, switching the mobile station to a sleep mode.

3. The method of claim 1, wherein the first and the second page indicators are separated from each other by at least 20 ms in time domain.

4. The method of claim 1, wherein the first and the second page indicators are optimized using a computer simulation.

5. The method of claim 1, wherein the first and the second page indicators each consists of a bit.

6. In a wireless communication system, wherein a paging channel, a quick paging channel, and a pilot channel are employed to transmit messages from a base station to a mobile station, the quick paging channel including first and second page indicators, the pilot channel including first and second pilot signals, the first pilot signal being associated with the first page indicator, the second pilot signal being associated with the second page indicator, a method comprising the steps of:

determining if the strength of the first pilot signal is smaller than a first threshold value;

determining if the strength of the first pilot signal is larger than a second threshold value, the first threshold value being larger than the second threshold value;

determining if the strength of the second pilot signal is smaller than the first threshold value;

determining if the strength of the second pilot signal is larger than the second threshold value;

if the strength of the first pilot signal is not smaller than the first threshold value, processing the first page indicator, and determining if the first page indicator is detected to be on;

if the strength of the first pilot signal is not smaller than the first threshold value, and if the first page indicator is detected to be on, decoding a subsequent paging channel slot;

if the strength of the first pilot signal is not smaller than the first threshold value, and if the first page indicator is detected to be off, switching the mobile station to a sleep mode;

if the strength of the first pilot signal is smaller than the first threshold value, and if the strength of the first pilot signal is larger than the second threshold value, saving a first soft decision for the first page indicator;

if the strength of the first pilot signal is smaller than the first threshold value, and if the strength of the second pilot signal is not smaller than the first threshold value, processing the second page indicator, and determining if the second page indicator is detected to be on;

if the strength of the first pilot signal is smaller than the first threshold value, if the strength of the second pilot signal is not smaller than the first threshold value, and if the second page indicator is detected to be on, decoding the subsequent paging channel slot;

if the strength of the first pilot signal is smaller than the first threshold value, if the strength of the second pilot signal is not smaller than the first threshold value, and if the second page indicator is detected to be off, switching the mobile station to a sleep mode;

if the strength of the first pilot signal is smaller than the first threshold value, and if the strength of the second pilot signal is not larger than the second threshold value, decoding the subsequent paging channel slot;

if the strength of the first pilot signal is smaller than the first threshold value, and if the strength of the second pilot signal is larger than the second threshold value, saving a second soft decision for the second page indicator, combining the first and the second soft decisions to obtain a combined decision, and determining if the combined decision is on;

if the strength of the first pilot signal is smaller than the first threshold value, if the strength of the second pilot signal is larger than the second threshold value, and if the combined decision is on, decoding the subsequent paging channel slot; and the strength of the first pilot signal is smaller than the first threshold value, if the strength of the second pilot signal is larger than the second threshold value, and if the combined decision is off, switching the mobile station to a sleep mode.

7. The method of claim 6, wherein the first and the second page indicators are separated from each other by at least 20 ms in time domain.

8. The method of claim 6, wherein the first and the second page indicators are optimized using a computer simulation.

9. The method of claim 6, wherein the first and the second page indicators each consists of a bit.

10. In a wireless communication system, wherein a paging channel, a quick paging channel, and a pilot channel are employed to transmit messages from a base station to a mobile station, the quick paging channel including first and second page indicators, the mobile station comprising:

processor means for determining if the strength of a first pilot signal is smaller than a first threshold value, the first pilot signal residing in the pilot channel and being associated with the first page indicator;

processor means for determining if the strength of the first pilot signal is larger than a second threshold value, the first threshold value being larger than the second threshold value;

processor means for determining if the strength of a second pilot signal is smaller than the first threshold value, the second pilot signal residing in the pilot channel and being associated with the second page indicator;

processor means for determining if the strength of the second pilot signal is larger than the second threshold value;

processor means for processing the first page indicator, and determining if the first page indicator is detected to be on, if the strength of the first pilot signal is not smaller than the first threshold value;

processor means for saving a first soft decision for the first page indicator, if the strength of the first pilot signal is smaller than the first threshold value, and if the strength of the first pilot signal is larger than the second threshold value;

processor means for processing the second page indicator, and determining if the second page indicator is detected to be on, if the strength of the first pilot signal is smaller than the first threshold value, and if the strength of the second pilot signal is not smaller than the first threshold value; and processor means for saving a second soft decision for the second page indicator, combining the first and the second soft decisions to obtain a combined decision, and determining if the combined decision is on, if the strength of the first pilot signal is smaller than the first threshold value, and if the strength of the second pilot signal is larger than the second threshold value.

11. The mobile station of claim 10, further comprising:

processor means for decoding a subsequent paging channel slot, if the strength of the first pilot signal is not smaller than the first threshold value, and if the first page indicator is detected to be on;

processor means for switching the mobile station to a sleep mode, if the strength of the first pilot signal is not smaller than the first threshold value, and if the first page indicator is detected to be off;

processor means for decoding the subsequent paging channel slot, if the strength of the first pilot signal is smaller than the first threshold value, if the strength of the second pilot signal is not smaller than the first threshold value, and if the second page indicator is detected to be on;

processor means for switching the mobile station to a sleep mode, if the strength of the first pilot signal is smaller than the first threshold value, if the strength of the second pilot signal is not smaller than the first threshold value, and if the second page indicator is detected to be off;

processor means for decoding the subsequent paging channel slot, if the strength of the first pilot signal is smaller than the first threshold value, and if the strength of the second pilot signal is not larger than the second threshold value;

processor means for decoding the subsequent paging channel slot, if the strength of the first pilot signal is smaller than the first threshold value, if the strength of the second pilot signal is larger than the second threshold value, and if the combined decision is on; and processor means for switching the mobile station to a sleep mode, if the strength of the first pilot signal is smaller than the first threshold value, if the strength of the second pilot signal is larger than the second threshold value, and if the combined decision is off.

12. The mobile station of claim 10, wherein the first and the second page indicators are separated from each other by at least 20 ms in time domain.

13. The mobile station of claim 10, wherein the first and the second page indicators are optimized using a computer simulation.

14. The mobile station of claim 10, wherein the first and the second page indicators each consists of a bit.

15. In a wireless communication system, wherein a paging channel, a quick paging channel, and a pilot channel are employed to transmit messages from a base station to a mobile station, the quick paging channel including first and second page indicators, the mobile station comprising:

processor means for determining if the strength of a first pilot signal is smaller than a first threshold value, the first pilot signal residing in the pilot channel and being associated with the first page indicator;

processor means for determining if the strength of the first pilot signal is larger than a second threshold value, the first threshold value being larger than the second threshold value;

processor means for determining if the strength of a second pilot signal is smaller than the first threshold value, the second pilot signal residing in the pilot channel and being associated with the second page indicator;

processor means for determining if the strength of the second pilot signal is larger than the second threshold value;

processor means for processing the first page indicator, and determining if the first page indicator is detected to be on, if the strength of the first pilot signal is not smaller than the first threshold value;

processor means for saving a first soft decision for the first page indicator, if the strength of the first pilot signal is smaller than the first threshold value, and if the strength of the first pilot signal is larger than the second threshold value;

processor means for processing the second page indicator, and determining if the second page indicator is detected to be on, if the strength of the first pilot signal is smaller than the first threshold value, and if the strength of the second pilot signal is not smaller than the first threshold value;

processor means for saving a second soft decision for the second page indicator, combining the first and the second soft decisions to obtain a combined decision, and determining if the combined decision is on, if the strength of the first pilot signal is smaller than the first threshold value, and if the strength of the second pilot signal is larger than the second threshold value;

processor means for decoding a subsequent paging channel slot, if the strength of the first pilot signal is not smaller than the first threshold value, and if the first page indicator is detected to be on;

processor means for switching the mobile station to a sleep mode, if the strength of the first pilot signal is not smaller than the first threshold value, and if the first page indicator is detected to be off;

processor means for decoding the subsequent paging channel slot, if the strength of the first pilot signal is smaller than the first threshold value, if the strength of the second pilot signal is not smaller than the first threshold value, and if the second page indicator is detected to be on;

processor means for switching the mobile station to a sleep mode, if the strength of the first pilot signal is smaller than the first threshold value, if the strength of the second pilot signal is not smaller than the first threshold value, and if the second page indicator is detected to be off;

processor means for decoding the subsequent paging channel slot, if the strength of the first pilot signal is smaller than the first threshold value, and if the strength of the second pilot signal is not larger than the second threshold value;

processor means for decoding the subsequent paging channel slot, if the strength of the first pilot signal is smaller than the first threshold value, if the strength of the second pilot signal is larger than the second threshold value, and if the combined decision is on; and processor means for switching the mobile station to a sleep mode, if the strength of the first pilot signal is smaller than the first threshold value, if the strength of the second pilot signal is larger than the second threshold value, and if the combined decision is off.

16. The mobile station of claim 15, wherein the first and the second page indicators are separated from each other by at least 20 ms in time domain.

17. The mobile station of claim 15, wherein the first and the second page indicators are optimized using a computer simulation.

18. The mobile station of claim 15, wherein the first and the second page indicators each consists of a bit.

* * * * *